United States Patent
Demeter et al.

(10) Patent No.: US 11,020,713 B2
(45) Date of Patent: Jun. 1, 2021

(54) ION SELECTIVE MEMBRANE WITH IONOPHORES

(71) Applicant: Magna Imperio Systems Corp., Houston, TX (US)

(72) Inventors: Ethan Demeter, The Woodlands, TX (US); Michael James Connor, Jr., Porter, TX (US); Brian M. McDonald, Houston, TX (US)

(73) Assignee: Magna Imperio Systems Corp., Houston, TX (US)

( * ) Notice: Subject to any disclaimer, the term of this patent is extended or adjusted under 35 U.S.C. 154(b) by 41 days.

(21) Appl. No.: 16/454,935

(22) Filed: Jun. 27, 2019

(65) Prior Publication Data

US 2020/0001251 A1    Jan. 2, 2020

Related U.S. Application Data

(60) Provisional application No. 62/691,764, filed on Jun. 29, 2018.

(51) Int. Cl.
| | | |
|---|---|---|
| *B01D 61/46* | (2006.01) | |
| *B01D 71/82* | (2006.01) | |
| *B01D 69/12* | (2006.01) | |
| *B01D 71/60* | (2006.01) | |
| *B01D 69/02* | (2006.01) | |

(52) U.S. Cl.
CPC .............. *B01D 71/82* (2013.01); *B01D 61/46* (2013.01); *B01D 69/02* (2013.01); *B01D 69/12* (2013.01); *B01D 71/60* (2013.01); *B01D 2325/42* (2013.01)

(58) Field of Classification Search
CPC ........ B01D 71/82; B01D 61/46; B01D 69/12; B01D 71/60; B01D 69/02; B01D 2325/42; B01D 61/422; C08J 2479/02; C08J 5/2206; C08J 7/0427
See application file for complete search history.

(56) References Cited

U.S. PATENT DOCUMENTS

| | | | |
|---|---|---|---|
| 9,786,941 B2 * | 10/2017 | Fuller | .................. H01M 8/1004 |
| 2012/0031834 A1 | 2/2012 | Higa et al. | |
| 2014/0072900 A1 | 3/2014 | Fuller et al. | |
| 2017/0028396 A1 | 2/2017 | Park et al. | |

FOREIGN PATENT DOCUMENTS

WO    2019/126773    6/2019

OTHER PUBLICATIONS

Suzuki et al. (Dec. 1993). "Design and Synthesis of Highly Selective Ionophores for Lithium Ion Based on 14-Crown-4 Derivatives for an Ion-Selective Electrode," Anal. Chem. 65(23): 3404-3410.

(Continued)

*Primary Examiner* — Arun S Phasge
(74) *Attorney, Agent, or Firm* — Morrison & Foerster LLP

(57) ABSTRACT

The present disclosure is directed an ion exchange membrane that has an increased affinity for a specific ionic species. The ion exchange membranes disclosed herein include ionophores that can increase ion-selectivity. These ion exchange membranes can be incorporated to various ion-exchange systems or devices that can selectively separate ions of value.

17 Claims, 4 Drawing Sheets

(56) References Cited

OTHER PUBLICATIONS

White et al. (Mar. 2015). "Coating of Nafion Membranes with Polyelectrolyte Multilayers to Achieve High Monovalent/Divalent Cation Electrodialysis Selectivities," ACS Appl. Mater. Interfaces 7: 6620-6628.
Xu et al. (2018). "Selective Separation of Mono- and Di-valent Cations in Electrodialysis During Brackish Water Desalination: Bench and Pilot-Scale Studies," Desalination 428: 146-160.
International Search Report and Written Opinion dated Oct. 4, 2019, directed to International Application No. PCT/US19/39598; 14 pages.

\* cited by examiner

ION SELECTIVE MEMBRANE WITH IONOPHORES

CROSS REFERENCE TO RELATED APPLICATIONS

This application claims the benefit of U.S. Provisional Application No. 62/691,764, filed Jun. 29, 2018, the entire contents of which are incorporated herein by reference.

FIELD OF THE DISCLOSURE

This disclosure relates to selectively removing ions from a stream containing multiple ions. More specifically, this disclosure relates to an ion selective membrane containing ionophores that can selectively remove ions from a stream containing multiple ions.

BACKGROUND OF THE INVENTION

As traditional means of extraction become exhausted from overuse, new sources of raw materials become more economically viable. For example, saltwater brines represent an opportunity for the reclamation of high value commodity elements or minerals. Commodity element and/or mineral production can be challenged by the joint factors of extraction and purification. Where traditional mining methods have the benefit of high concentrations of elements in solid form, brines are challenging by their dilute nature and the co-existence of less valuable ions. Currently, utilization of these brine streams requires vast amount of land to be used for evaporation ponds as well as multiple separation steps to extract the element/minerals/chemicals of value.

BRIEF SUMMARY OF THE INVENTION

Applicants have discovered an ion exchange membrane that has an increased affinity for a specific ionic species. Specifically, Applicants have discovered a way of incorporating ionophores either in the membrane itself or into a coating placed on the membrane to impart specific ion-selectivity. These ion exchange membranes can be incorporated into an ion-exchange system or device that can selectively separate ions of value directly from brine streams. In addition, these systems can complete the separation with far smaller land use than traditional extraction methods.

When the ion exchange membranes disclosed herein are incorporated into an electrochemical device, such as an electrodialyzer or a reverse electrodialyzer, an electric potential can be used to drive the ions from one stream to another. In some embodiments, at least one of the alternating cation and anion exchange membranes is an ion exchange membrane containing ionophores as disclosed herein.

The systems described herein can also combine a reverse electrodialysis device with a traditional electrodialysis device (or reverse osmosis device) to efficiently separate high value species from a brine stream. For example, a reverse electrodialysis device utilizing the ion-specific membranes disclosed herein can be used to strip a high value ion from a brine solution and be combined with a traditional electrodialysis device to produce a concentrated stream of the high value ionic species. In addition, fresh water that is produced from the electrodialyzer can be recycled to the reverse electrodialyzer.

In some embodiments, n ion exchange membrane includes at least one layer on a side of the membrane, wherein the at least one layer includes: a polymer; and an ionophore. In some embodiments, the polymer comprises a polycation or a polyanion. In some embodiments, the polymer comprises a polyelectrolyte. In some embodiments, the at least one layer comprises 0.5-5 wt. % of the ionophore. In some embodiments, the ionophore is a crown ether or derivative thereof. In some embodiments, the crown ether or derivative thereof is 14-crown-4 ether or derivative thereof. In some embodiments, the ion exchange membrane is a cation exchange membrane or an anion exchange membrane. In some embodiments, the at least one layer is 0.1-10 wt. % of the total weight of the ion exchange membrane and the at least one layer.

In some embodiments, a method of forming an ion exchange membrane includes mixing an ionophore with a polymeric solution to form a coating composition and coating a side of the ion exchange membrane with the coating composition. In some embodiments, the polymeric solution comprises polyethyleneimine. In some embodiments, the polymeric solution comprises a polyelectrolyte. In some embodiments, the coating composition comprises 0.5-5 wt. % of the ionophore. In some embodiments, the ionophore is a crown ether or derivative thereof. In some embodiments, the crown ether or derivative thereof is 14-crown-4 ether or derivative thereof. In some embodiments, the ion exchange membrane is a cation exchange membrane or an anion exchange membrane.

In some embodiments, an ion-exchange device includes a pair of electrodes comprising an anode and a cathode; a first ion exchange membrane and a second ion exchange membrane between the pair of electrodes, wherein at least one of the first or second ion exchange membranes includes at least one layer on a side of the membrane, wherein the at least one layer comprises a polymer and an ionophore. In some embodiments, the first ion exchange membrane is a cation exchange membrane and the second ion exchange membrane is an anion exchange membrane.

Additional advantages will be readily apparent to those skilled in the art from the following detailed description. The examples and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

Exemplary embodiments are described with reference to the accompanying figures, in which.

DETAILED DESCRIPTION OF THE INVENTION

The ion exchange membranes disclosed herein include ionophores. An ionophore is a material that has a particular affinity to a specific ion. In biology, ionophores are chemical species that help catalyze transport of ions across cell membranes. Outside of biology, ionophores have been used to create sensors (i.e., Ion Selective Electrodes) to measure concentrations of dissolved species. For example, Suzuki, K. et al. Design and synthesis of highly selective ionophores for lithium ion based on 14-crown-4 derivatives for an ion-selective electrode. *Anal. Chem.* 65, 3404-3410 (1993), which is hereby incorporated by reference in its entirety, describes a class of crown ethers, such as 14-crown-4 ether, and derivatives thereof, that have an affinity towards Lithium ("Li$^+$"). Suzuki described the use of 14-crown-4 compounds for the development of a Li$^+$ sensor by combining the ionophore with a PVC membrane.

Applicants have discovered ion exchange membranes that include ionophores to greatly increase the selectivity of the ion exchange membrane for a particular ionic species. These ion exchange membranes can be incorporated into an ion-exchange system or device that can selectively separate ions of value.

In order to make an ion exchange membrane selective to a particular ionic species, Applicants have discovered a method of incorporating an ionophore either into the ion exchange membrane itself or into a coating to be placed onto the ion exchange membrane. Typical ion exchange membranes exhibit relatively low selectivity among ions. As such, applying polymeric coatings to ion exchange membranes can increase the ion selectivity. In some embodiments, the polymeric coating can be a single polycation coating, such as polyethyleneimine, a single polyanion coating, such as poly-(styrenesulfonate), or a mixture of the two called a polyelectrolyte coating. In some embodiments, polyelectrolyte layers and/or polycation and/or polyanion layers can be added to an ion exchange membrane to increase the ion selectivity of the membrane. Examples of polyelectrolyte coatings/layers can be found in White, N., Misovich, M., Yaroshchuk, A. & Bruening, M. L. Coating of Nafion Membranes with Polyelectrolyte Multilayers to Achieve High Monovalent/Divalent Cation Electrodialysis Selectivities. *ACS Appl. Mater. Interfaces* 7, 6620-6628 (2015), which is hereby incorporated by reference in its entirety. Examples of the addition of polycation, polyethyleneimine, layers can be found in Xu, X. et al. Selective separation of mono- and di-valent cations in electrodialysis during brackish water desalination: Bench and pilot-scale studies. *Desalination* 428, 146-160 (2018), which is hereby incorporated by reference in its entirety. Polyelectrolyte and polycation or polyanion coatings/layers can increase the selectivity of the ion exchange membranes towards monovalent ions over multivalent ions due to charge repulsion and/or size exclusion.

Figure 1:
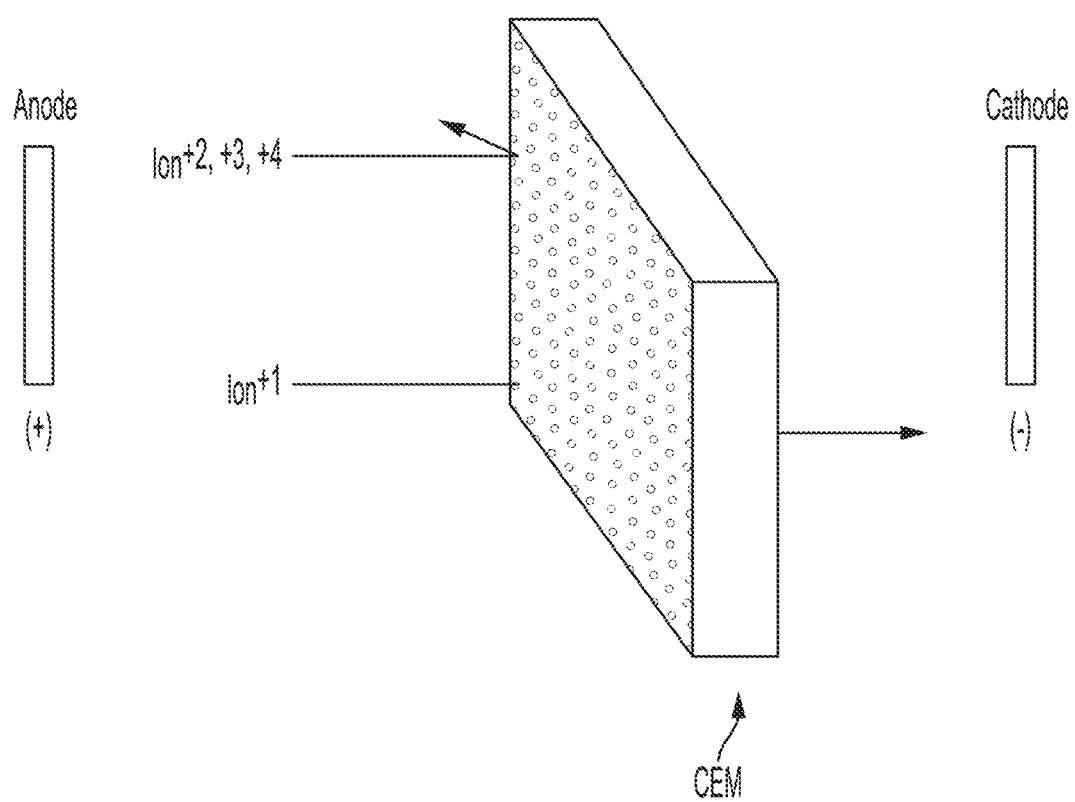
FIG. 1 illustrates an example of an ion exchange membrane with a polymeric coating.

FIG. 1 illustrates an ion exchange membrane with a polymeric coating on one side. The polymeric coating can be a polyanion coating, a polycation coating, or a mixture of polyanions and polycations (i.e., a polyelectrolyte) on a surface of an ion exchange membrane. The ion exchange membrane can be an anion exchange membrane or a cation exchange membrane. The coating can make the ion exchange membrane more selective to singly-charged ionic species (i.e., monovalent ions), as shown in FIG. 1, relative to multiply-charged species (i.e., multivalent or polyvalent ions).

Within the polymeric coatings/layers, ionophores can be introduced. The ionophores can cooperatively act with the polymeric coating/layer(s). The polymeric coating can exclude the transport of undesired ions. These polymeric coatings can exclude multi-valent ions. The addition of ionophores to the polyelectrolyte or polycat/anion layer can add an additional filter to the polymeric layer that can exclude monovalent ions that are not the ion of interest.

In some embodiments, ionophores can be introduced to the coating composition prior to coating the ion exchange membrane. The coating composition can be a polymeric coating composition that can include polyelectrolyte(s) and/or polyethyleneimine. In some embodiments, the coating composition can include about 0.5-5 wt. % ionophore. The coating composition can then be applied to one or both sides of an ion exchange membrane (e.g., anion exchange membrane or cation exchange membrane). The coating can be applied by dip-coating, spray-coating, roll-coating, or any other coating method known in the art. The final coating on the ion exchange membrane can be about 0.1-10 wt. % of the total ion exchange membrane (i.e., ion exchange membrane plus coated layer. In some embodiments, the final coating/layer(s) can include about 0.5-5 wt. % ionophore. The ionophores that are used can depend on the sought after ion to be recovered. In some embodiments, the ionophore can be any of the ionophores described in the Suzuki reference incorporated herein above. For example, the ionophores can be crown ethers or derivatives thereof. In some embodiments, the ionophores are 14-crown-4 ethers or derivatives thereof.

In other embodiments, ionophores are introduced to the polymeric coating/layer after the coating/layer has been applied to the ion exchange membrane. The resultant coating/layer containing ionophores on the ion exchange membrane can selectively separate the ion to which the ionophore has affinity. As such, Applicants can embed targeted ionophores to selectively transport desired ions.

These ion exchange membranes with ionophores can be incorporated into ion-exchange systems and devices. The ion-exchange systems and devices disclosed herein can include at least one pair of electrodes and at least one pair of ion exchange membranes placed there between. The at least one pair of ion exchange membranes can include a cation exchange membrane and an anion exchange membrane. In addition, at least one of the cation exchange membrane and/or anion exchange membranes has ionophores. In some embodiments, both the cation exchange membranes and the anion exchange membranes have ionophores.

Figure 2:
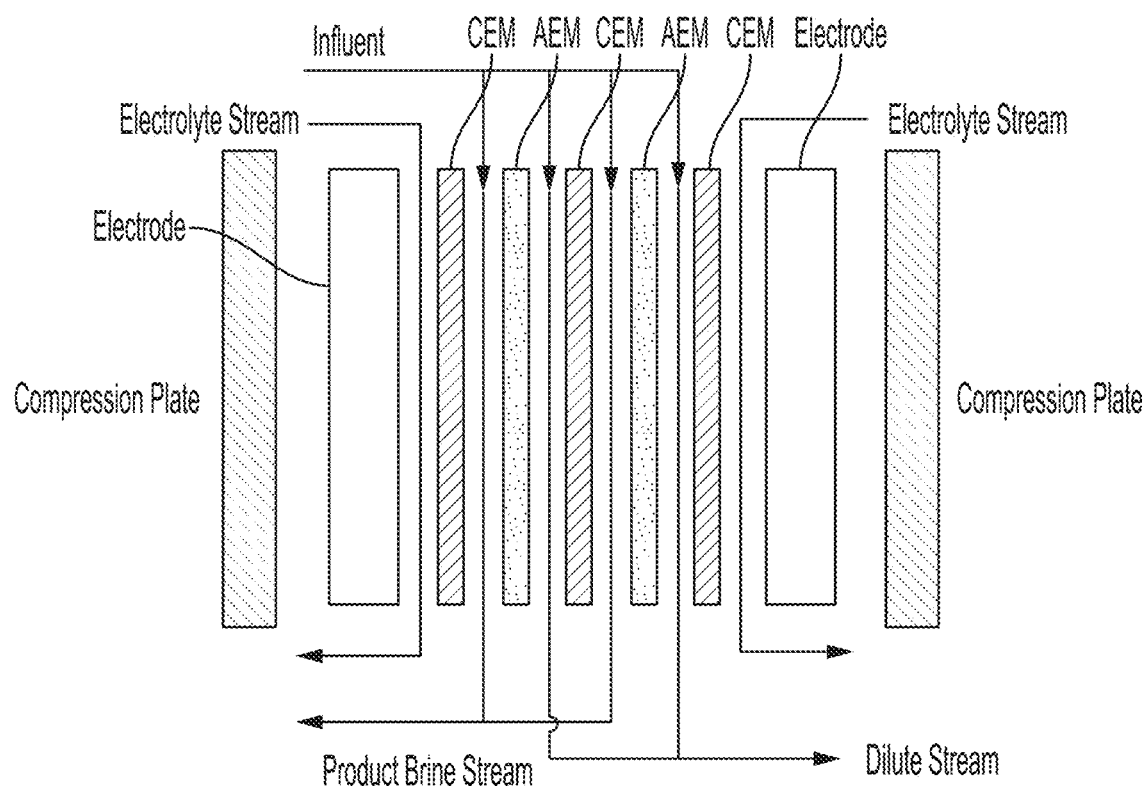
FIG. 2 illustrates an example of a schematic side view of an ion-exchange system disclosed herein.

FIG. 2 illustrates an example of a schematic side view of an electro-chemical ion separation device disclosed herein. The cation exchange membranes ("CEMs") and/or anion exchange membranes ("AEMs") can include ionophores. In some embodiments, the ion exchange membranes can have ionophores on both surfaces of the exchange membrane. When a voltage difference is applied across the device, positively charged cations can migrate toward the cathode and negatively charged anions can migrate toward the anode. Due to the permselectivity of the ion exchange membranes, alternate streams having increasing and decreasing ionic concentrates can occur. When the ion-selective membrane is incorporated into such a device, a much greater percentage of a desired ion can be transported through the membrane relative to a traditional ion exchange membrane.

The system shown in FIG. 2 also includes two electrodes on opposite ends of the device. One electrode can be a cathode and the other electrode can be an anode. These electrodes can encompass a series of fluid channels. These fluid channels can be separated by the ion exchange membranes (e.g., cation exchange membrane and anion exchange membrane). At least some of these fluid channels can receive an influent stream. The influent stream can be water to be purified or other streams carrying an ion of value and can be flowed through the channels in between the alternating anionic and cationic exchange membranes. Anion exchange membranes can preferentially allow passage of negatively charged ions and can substantially block the passage of positively charged ions. In contrast, cation exchange membranes can preferentially allow the passage of positively charged ions and can substantially block the passage of negatively charged ions.

The electrolyte fluid channels and streams can be in direct contact with the electrodes. In addition, these electrolyte streams may include the same or different fluid as the fluid entering the influent. For example, the electrolyte streams can be a variety of conductive fluids including, but not limited to, raw influent, a separately managed electrolyte fluid, NaCl solution, sodium sulfate solution, or iron chloride solution.

In an ion exchange system such as the one shown in FIG. 2, when an electric charge is applied to the electrodes, the ions in the influent stream flowing in the channels between the ion exchange membranes can migrate towards the electrode of opposite charge. The alternating arrangement of the ion exchange membranes can thus produce alternating channels of decreasing ionic concentration and increasing concentration. The number of channels between the ion exchange membranes may be increased through the addition of more alternating pairs of membranes to increase the capacity of the ion exchange system/device. In addition, the functioning ability of an individual ion exchange cell can be greatly augmented by configuring ion exchange cells into ion exchange stacks (i.e., a series of multiple ion exchange cells.)

The influent stream can be converted into a brine stream which is typically waste and a product/dilute stream. The product/dilute stream can have a lower ionic concentration. In some embodiments, the product stream can have a predetermined treatment level. For example, the ion exchange system can remove many types of ions or it could focus or be selective to a specific ion type such as arsenic, fluoride, perchlorate, lithium, gold, and/or silver. Examples of groups of ions can include, but are not limited to, monovalent and divalent.

In some embodiments, a brine stream can contain a particular cation/anion of interest. In such situations, it can be desirable to selectively remove the cation/anion of interest. Disclosed herein are modified cation/anion exchange membranes such that they have strong affinity toward the cation/anion of interest. In addition, these membranes can be incorporated into a reverse electrodialysis system/device. A brine stream(s) along with a dilute stream(s) can be fed to the reverse electrodialysis device. The ions can be moved from a concentrated stream to a less concentrated stream. By applying a voltage, the rate of ion transport can be controlled, and the resulting streams can be a product/dilute stream(s), wherein the cations/anions of interest have been transported, and a waste stream(s) containing the brine deficient in the ion(s) of interest.

Figure 3:
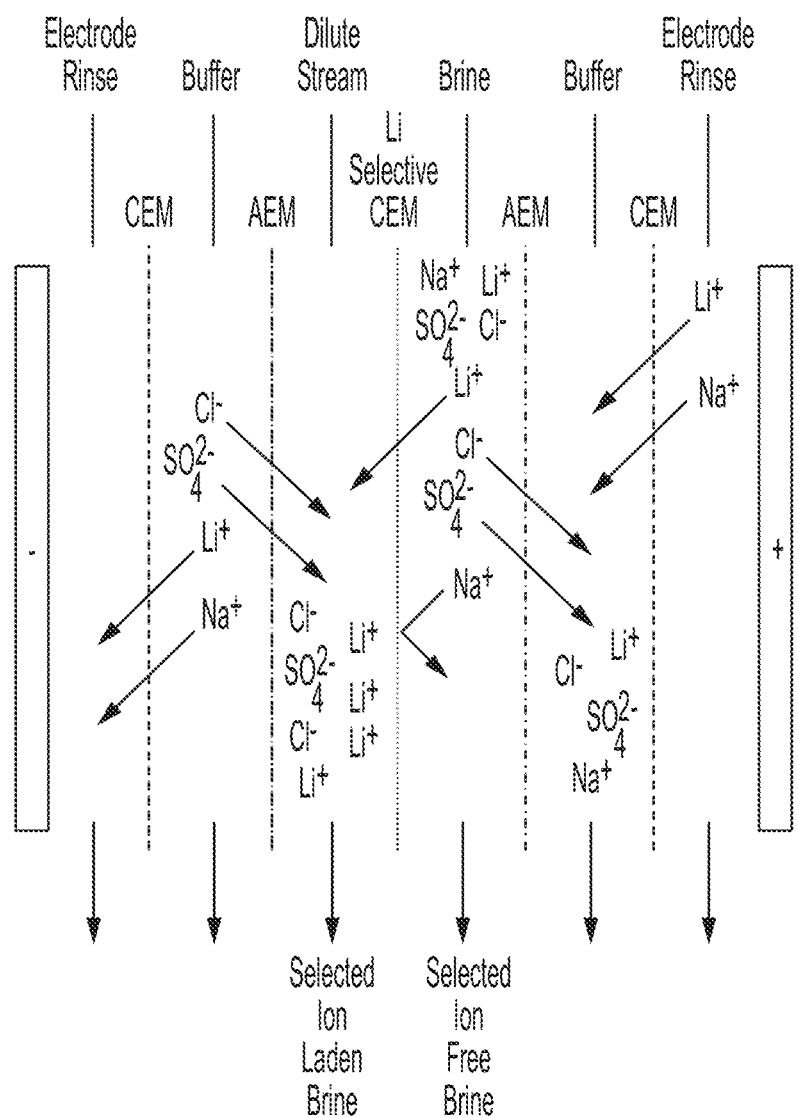
FIG. 3 illustrates an example of a schematic of a reverse electrodialysis system with an ion-selective exchange membrane disclosed herein.

FIG. 3 illustrates a reverse electrodialysis system with an ion selective exchange membrane incorporated therein. In FIG. 3, a brine stream containing an ion (e.g., lithium) to be stripped can be introduced to the system. This brine can be contacted by an ion (e.g., lithium) selective cationic exchange membrane ("CEM") on one side and an anion exchange membrane ("AEM") on the other side. The brine can also contain other cations that are undesirable in the concentrate stream. In some embodiments, the stream adjacent to the influent brine can be initially dilute. As such, the concentration gradient between the dilute stream and the influent brine can create an energetically favorable environment for the transfer of ions. This gradient can result in the transfer of ions into the influent dilute stream. However, due to the presence of the lithium selective CEM, only lithium can be allowed to transfer from the influent brine. Accordingly, to maintain charge neutrality anions can be drawn into the solution from the stream labeled buffer, but this can alternately be another brine stream. The combination of the dilute stream(s)/channel(s) and the influent stream(s)/channel(s) can be repeated numerous times to increase the overall capacity of the device. The product of such a process can be a brine stream containing the selected ion and a brine stream containing a reduced concentration of the selected ion.

The rate of ion transfer can be enhanced through application of an electric potential across the electrodes. The applied potential can add to the existing potential between the influent brine and dilute stream to accelerate the rate of transfer. The applied potential can also allow the net transfer of lithium ions if the gradient becomes unfavorable, more like traditional electrodialysis. The product/dilute stream(s) can then be passed to a traditional electrodialysis unit, where the ions of interest can be removed and sequestered into a higher concentration product brine. The dilute water made in the electrodialysis unit can then be recycled back to the reverse electrodialysis unit to be used again as a stripping medium for the ion(s) of interest.

Figure 4:
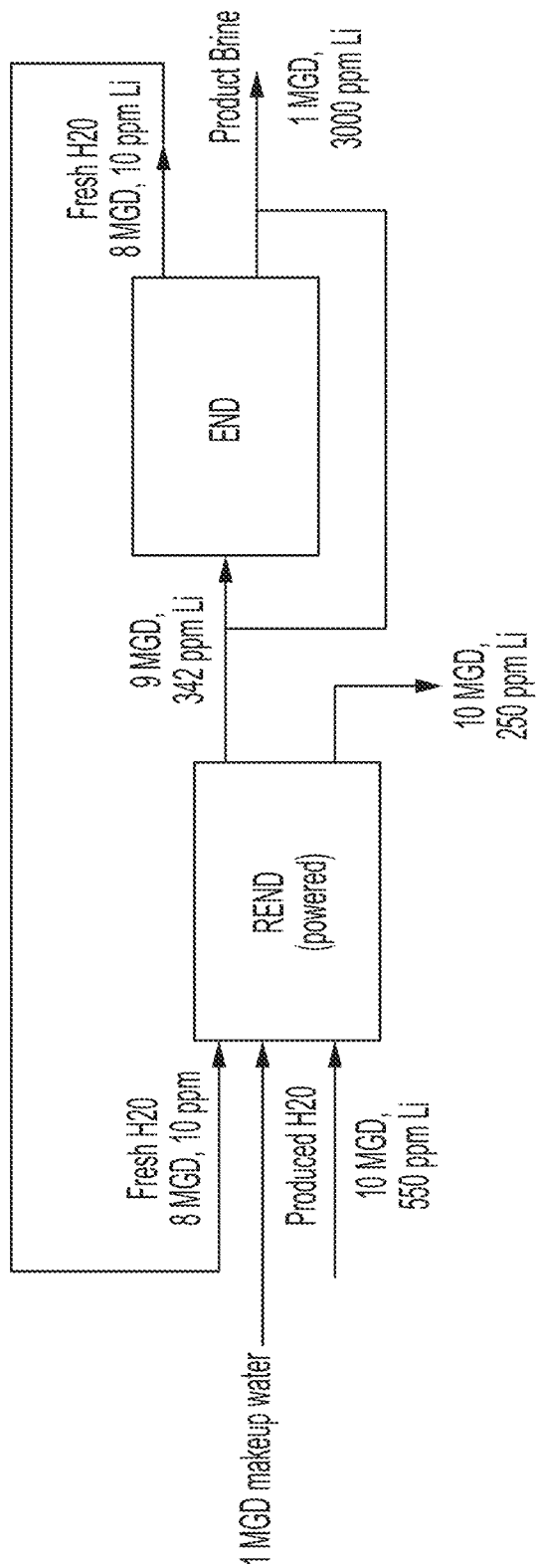
FIG. 4 illustrates an example of a process flow diagram to selectively remove and concentrate lithium ions.

FIG. 4 illustrates an example of process for stripping and concentrating a desired ion from an influent brine (e.g., produced water). The produced water and an amount of dilute water can be introduced to a reverse electrodialysis ("REND") device. The REND device can include at least one of the ion exchange membranes with ionophores described herein. The REND device can selectively move (in this case) lithium ions to the dilute stream. The REND device processing rate can be enhanced by applying a potential. The dilute stream can be laden with lithium, but should be concentrated further to improve recovery rates. A conventional electrodialysis device ("END") is shown in FIG. 4 which can increase the concentration of the brine (e.g., an increase tenfold in some embodiments). The concentration can be accomplished by a recirculation loop in some embodiments. The recovered diluate from the conventional electrodialysis device can be recycled back to the beginning of the process to be used as a reservoir for additional ion (e.g., lithium) transfer. Such a process can accelerate the recovery rates of the selective ion (e.g., lithium) from brines, which are conventionally recovered using evaporation ponds.

In some embodiments, the electrodialysis device can be replaced with a reverse osmosis process in the second concentrating step depending on water type and degree of concentration required. For example, effluent containing the desired ion from the powered reverse electrodialysis unit can be passed to a reverse osmosis system. Reverse osmosis can use hydraulic pressure to force water through a reverse osmosis membrane that can prevent passage of dissolved solids, such as the stripped ions. In some embodiments, this process step can be stand-alone or placed in line with a conventional electrodialysis unit used to further concentrate the reverse osmosis ion-laden brine. The clean effluent from the reverse osmosis unit can be recycled back to the reverse electrodialysis unit to be used as a stripping media.

EXAMPLE

In one example, an ion of interest to be selectively removed is lithium. There is a class of crown ethers, such as 14-crown-4 ether, and derivatives thereof, that have an affinity towards lithium. As such, Applicants can embed lithium-selectivity to a cation exchange membrane. The 14-crown-4 ionophore can be incorporated into a coating by mixing a small amount of the ionophore (i.e., between about 0.5% and 5% by weight) with polyethyleneimine. The coating can then be applied to one or both sides of the cation exchange membrane. The amount of the coating can be between about 0.1% to 10% by weight. The coated cation exchange membrane(s) can then be incorporated into a device such as an electrodialyzer or a reverse electrodialyzer and used to selective remove lithium ions from a stream.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure, and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments shown, but is to be accorded the widest scope consistent with the principles and features disclosed herein.

The invention claimed is:

1. An ion exchange membrane comprising at least one layer on a side of the membrane, wherein the at least one layer comprises:
    a polymer; and
    an ionophore having an affinity for lithium,
    wherein the ion exchange membrane is configured to selectively separate lithium from an influent stream comprising lithium.

2. The membrane of claim 1, wherein the polymer comprises a polycation or a polyanion.

3. The membrane of claim 1, wherein the polymer comprises a polyelectrolyte.

4. The membrane of claim 1, wherein the at least one layer comprises 0.5-5 wt. % of the ionophore.

5. The membrane of claim 1, wherein the ionophore is a crown ether or derivative thereof.

6. The membrane of claim 5, wherein the crown ether or derivative thereof is 14-crown-4 ether or derivative thereof.

7. The membrane of claim 1, wherein the ion exchange membrane is a cation exchange membrane or an anion exchange membrane.

8. The membrane of claim 1, wherein the at least one layer is 0.1-10 wt. % of the total weight of the ion exchange membrane and the at least one layer.

9. A method of forming an ion exchange membrane configured to selectively separate lithium from an influent stream comprising lithium, comprising:
    mixing an ionophore having an affinity for lithium with a polymeric solution to form a coating composition; and
    coating a side of the ion exchange membrane with the coating composition.

10. The method of claim 9, wherein the polymeric solution comprises polyethyleneimine.

11. The method of claim 9, wherein the polymeric solution comprises a polyelectrolyte.

12. The method of claim 9, wherein the coating composition comprises 0.5-5 wt. % of the ionophore.

13. The method of claim 9, wherein the ionophore is a crown ether or derivative thereof.

14. The method of claim 13, wherein the crown ether or derivative thereof is 14-crown-4 ether or derivative thereof.

15. The method of claim 9, wherein the ion exchange membrane is a cation exchange membrane or an anion exchange membrane.

16. An ion-exchange device comprising:
    a pair of electrodes comprising an anode and a cathode;
    a first ion exchange membrane and a second ion exchange membrane between the pair of electrodes,
    wherein at least one of the first or second ion exchange membranes comprises at least one layer on a side of the membrane, wherein the at least one layer comprises a polymer and an ionophore having an affinity for lithium, and wherein the at least one of the first or second ion exchange membranes is configured to selectively separate lithium from an influent stream comprising lithium.

17. The device of claim 16, wherein the first ion exchange membrane is a cation exchange membrane and the second ion exchange membrane is an anion exchange membrane.

* * * * *